No. 640,742. Patented Jan. 9, 1900.
F. O. BULLIS.
GEARING.
(Application filed Apr. 8, 1899.)
(No Model.)

Witnesses
Jno Mmee
David W. Gould.

Inventor
F. O. Bullis
by Benj. R. Catlin
Attorney

UNITED STATES PATENT OFFICE.

FREDERICK O. BULLIS, OF ROCHESTER, NEW YORK.

GEARING.

SPECIFICATION forming part of Letters Patent No. 640,742, dated January 9, 1900.

Application filed April 8, 1899. Serial No. 712,241. (No model.)

*To all whom it may concern:*

Be it known that I, FREDERICK O. BULLIS, a resident of Rochester, in the county of Monroe and State of New York, have invented certain new and useful Improvements in Gearing; and I do hereby declare the following to be a full, clear, and exact description of the invention, such as will enable others skilled in the art to which it pertains to make and use the same.

The invention relates to power-transmitting gear-wheels, and has for its object to provide wheels with intermeshing parts that shall coact with certainty and steadiness.

The invention consists in the construction hereinafter described and pointed out.

Figure 1:
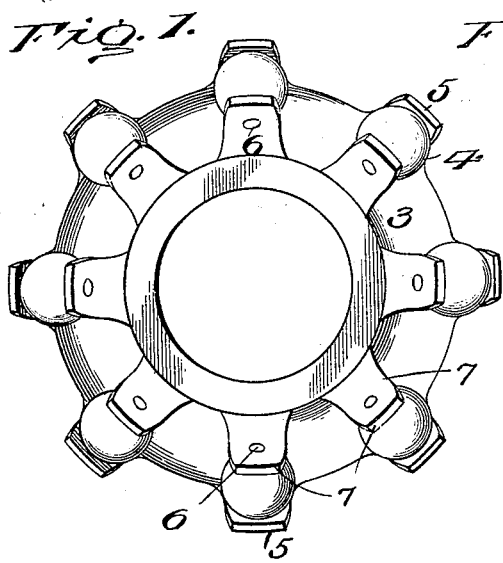
Figure 2:
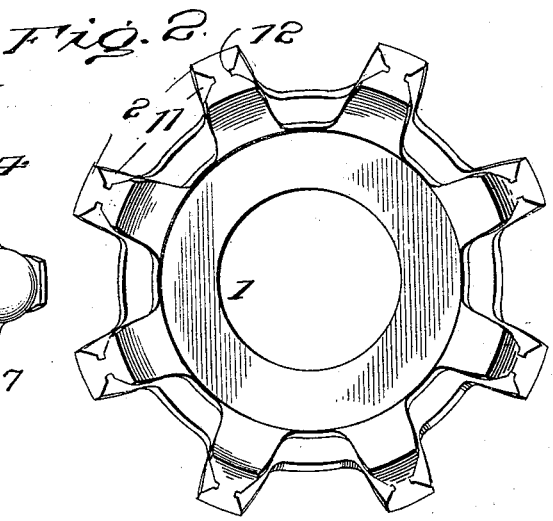
Figure 3:
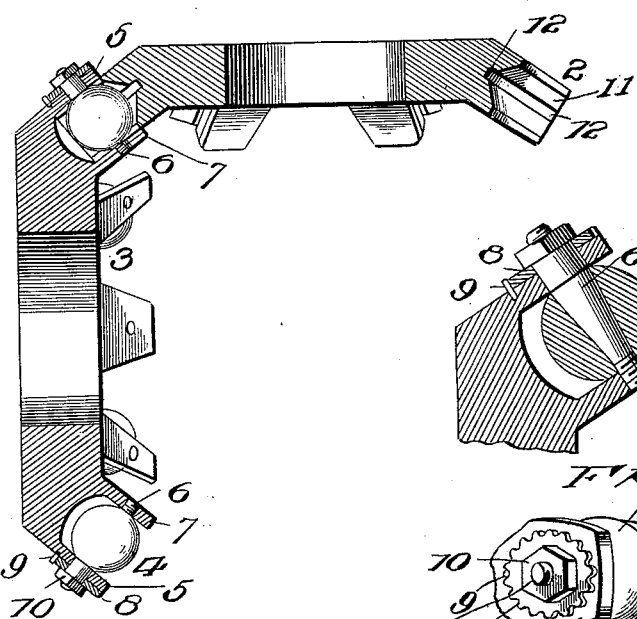
Figure 4:
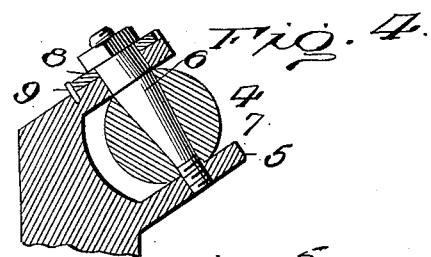
Figure 5:
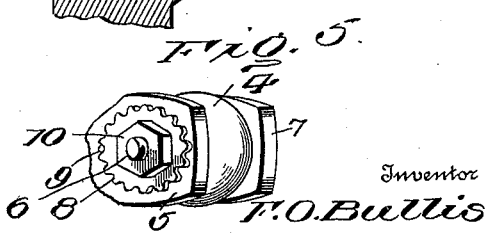

In the accompanying drawings, Figure 1 is a plan view of a gear-wheel with roller-teeth. Fig. 2 is a similar view of a gear-wheel adapted to coact with that shown in Fig. 1. Fig. 3 is a section of the wheels in operative situation with respect to each other. Fig. 4 is a partial enlarged section showing a pivot-lock. Fig. 5 is a partial plan of the same.

Numeral 1 denotes a wheel having teeth 2. A coacting wheel is denoted by 3, and 4 are spherical or spheroidal roller-teeth supported to turn in ears 5 of the wheel 3.

6 denotes pivots of approximately frustoconical form that can be set up to compensate for wear on the interior of the roller-teeth 4. These pivots are secured into one of the wheel-ears 7 and locked by a ratcheted disk or washer 8. This disk has an angular connection with the pivot to prevent its independent rotation.

9 is a pin engaging the disk periphery, as shown. To adjust the pivot to take up wear, the nut 10 is loosened and the disk moved to release the pivot, which can then be screwed through the ear 7 and set home to its proper bearing in the roller 4, whereupon the pivot is locked by causing the notched periphery of the disk 8 to engage the pin 9 and securing it by the nut 10.

11 denotes grooves approximately of a V form in cross-section and situated in the inclined faces of each tooth 2.

12 denotes a recess formed by cutting away the material of wheel 1 at what would otherwise be the meeting-point of proximate grooves in the tooth-faces. This undercut recess provides, in grinding the separate faces of the grooves, that the tool may be carried to the bottom of the faces without striking an oppositely-adjacent face of the groove, thus providing that each face can be finished without marring any other.

The rollers extend into the grooves of the teeth, each having two opposite bearings therein, and as the walls of the grooves become worn the wheels can be set up to avoid backlash. Whatever tendency a roller might otherwise have to be crowded against one of its supporting-ears is counteracted by the opposite groove-face.

Some of the advantages of roller and grooved teeth combined, as herein set forth, would be secured by grooves having other forms in cross-section, but the V form is preferable.

Having thus described my invention, what I claim is—

1. The combination of the gear-wheels, one having fixed teeth with grooved faces and the other having roller-teeth to mesh with the fixed teeth and rotating in and lengthwise the grooves, said grooves having an approximate V form in cross-section.

2. The combination of the gear-wheels, one having fixed teeth with grooved faces and the other having roller-teeth to mesh with the fixed teeth and rotating in and lengthwise the grooves, said grooves having an approximate V form in cross-section, and terminating near their bottoms in undercut recesses.

3. A pair of gear-wheels, one having rigid teeth with grooved faces, and the other having roller-teeth to engage the rigid teeth, said roller-teeth projecting into the grooves of the rigid teeth, as specified.

4. Gear-wheels, one having rigid grooved teeth, and the other having roller-teeth to engage the rigid teeth, and conical pivots for the roller-teeth, in combination with toothed disks on the pivots, and pins held by the gear to engage the disks, and retaining-nuts for the disks.

In testimony whereof I have signed this specification in the presence of two subscribing witnesses.

FREDERICK O. BULLIS.

Witnesses:
   BENJ. R. CATLIN,
   G. W. BALLOCH.